(12) United States Patent
McFadden et al.

(10) Patent No.: US 11,370,363 B2
(45) Date of Patent: Jun. 28, 2022

(54) FISHING ROD CARRIER

(71) Applicant: Yakima Products, Inc., Lake Oswego, OR (US)

(72) Inventors: Scott A. McFadden, Portland, OR (US); Marcos Henry Rodriguez, Portland, OR (US); Jason Attfield Sagen, Portland, OR (US); John Mark Elliott, Beaverton, OR (US); Fangyuan Tian, Nanjing (CN)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

(21) Appl. No.: 16/834,959

(22) Filed: Mar. 30, 2020

(65) Prior Publication Data

US 2020/0307464 A1 Oct. 1, 2020

Related U.S. Application Data

(60) Provisional application No. 62/826,891, filed on Mar. 29, 2019.

(51) Int. Cl.
*B60R 9/08* (2006.01)
*A01K 97/08* (2006.01)
(Continued)

(52) U.S. Cl.
CPC ............... *B60R 9/08* (2013.01); *A01K 97/08* (2013.01); *A01K 97/10* (2013.01); *B60R 11/00* (2013.01);
(Continued)

(58) Field of Classification Search
CPC ..... B60R 9/08; B60R 11/00; B60R 2011/004; B60R 2011/0059; A01K 97/08; A01K 97/10
See application file for complete search history.

(56) References Cited

U.S. PATENT DOCUMENTS 2,149,087 A * 2/1939 Fisher .................... A01K 97/08
43/26
2,591,674 A * 4/1952 Chalker ................. A01K 97/08
220/324
(Continued)

FOREIGN PATENT DOCUMENTS

FR 1419803 A * 12/1965 ............. A01K 97/08
GB 2015311 A * 9/1979 ............. A01K 97/08

OTHER PUBLICATIONS

Big Sky Rod Box, "BSRB Original Fly Rod Carrier—Big Sky Rod Box" www.flyrodbox.com/products/bsrb-original, 8 pages, retrieved on Apr. 30, 2020.

*Primary Examiner* — Stanton L Krycinski
(74) *Attorney, Agent, or Firm* — Kolisch Hartwell, P.C.

(57) ABSTRACT

A fishing rod carrier includes a plurality of horizontal elongate tubes each sized to receive a fishing rod, the elongate tubes being stacked on plural levels, each elongate tube is capped at the distal end. A reel box is attached to the proximal ends of the plurality of elongate tubes and defines an interior space that is continuous with an interior of each of the plurality of elongate tubes, and is configured to enclose a plurality of reels while they are attached to a corresponding plurality of fishing rods disposed within the plurality of elongate tubes. A clamping mechanism is configured to secure the fishing rod carrier to a rooftop rack of an auto.

20 Claims, 14 Drawing Sheets

(51) Int. Cl.
  *B60R 11/00*   (2006.01)
  *A01K 97/10*   (2006.01)
(52) U.S. Cl.
  CPC . *B60R 2011/004* (2013.01); *B60R 2011/0059* (2013.01)

(56) References Cited

U.S. PATENT DOCUMENTS

| | | | | |
|---|---|---|---|---|
| 2,640,622 A * | 6/1953 | Sabatino | A01K 97/08 | 220/521 |
| 2,650,449 A * | 9/1953 | Suring | A01K 97/08 | 43/26 |
| 2,902,790 A * | 9/1959 | Harvey | A01K 97/08 | 43/26 |
| 3,033,259 A * | 5/1962 | Landis, Sr. | A01K 97/08 | 206/315.11 |
| 3,113,363 A * | 12/1963 | Fyvie | A01K 87/00 | 211/70.8 |
| 3,406,930 A † | 10/1968 | Seiler | | |
| 3,662,933 A * | 5/1972 | Michal | B60R 9/08 | 224/319 |
| 4,306,601 A * | 12/1981 | Wallis | A01K 97/08 | 206/315.11 |
| 4,335,840 A * | 6/1982 | Williams | B60R 9/04 | 224/315 |
| 4,523,704 A * | 6/1985 | Washington | B60R 9/08 | 224/328 |
| 4,572,416 A * | 2/1986 | Upham | B60R 9/08 | 224/326 |
| 4,858,366 A † | 8/1989 | Rushton | | |
| 4,967,504 A * | 11/1990 | Craft | A01K 97/08 | 43/26 |
| 5,046,279 A * | 9/1991 | Smith | A01K 97/08 | 43/26 |
| 5,319,874 A * | 6/1994 | Vance | A01K 97/08 | 206/315.1 |
| 5,341,590 A * | 8/1994 | Hepworth | A01K 97/08 | 206/315.11 |
| 5,450,956 A * | 9/1995 | Peckenpaugh, Sr. | A01K 97/08 | 206/315.11 |
| 5,488,799 A * | 2/1996 | Hauschild | A45F 3/00 | 43/26 |
| 5,586,515 A † | 12/1996 | Nickles | | |
| 5,678,348 A * | 10/1997 | Zielinski | A01K 97/08 | 43/26 |
| 5,836,103 A * | 11/1998 | Taylor | A01K 97/08 | 43/26 |
| 5,937,568 A * | 8/1999 | Morgan | A01K 97/08 | 43/21.2 |
| 6,003,748 A * | 12/1999 | Rivenbark | B60R 9/08 | 211/70.8 |
| 6,283,288 B1 * | 9/2001 | Rich | A01K 97/06 | 206/315.11 |
| D458,747 S * | 6/2002 | Hields | | D3/260 |
| 6,668,481 B2 * | 12/2003 | Garcia | A01K 97/08 | 43/26 |
| 6,760,994 B2 * | 7/2004 | Henault | A01K 97/08 | 206/315.11 |
| 7,293,746 B2 * | 11/2007 | Brundage | E21B 47/01 | 248/230.7 |
| 7,322,149 B1 * | 1/2008 | Quintero | A01K 97/08 | 206/315.11 |
| 7,555,861 B1 * | 7/2009 | Zakarian | A01K 97/08 | 248/511 |
| 7,877,922 B1 | 2/2011 | Petrie et al. | | |
| 7,909,378 B2 * | 3/2011 | Alley | A01K 97/08 | 294/143 |
| D653,446 S | 2/2012 | Bode | | |
| 8,757,399 B2 * | 6/2014 | Wolfbauer | A47B 81/005 | 211/70.8 |
| 8,783,748 B1 * | 7/2014 | Quinn | A01K 97/08 | 294/159 |
| 10,375,944 B2 * | 8/2019 | Smigaj | | B60R 9/08 |
| 10,486,612 B2 * | 11/2019 | McCoy | | B60R 9/08 |
| D887,134 S * | 6/2020 | Strand | | D3/260 |
| D888,421 S * | 6/2020 | Strand | | D3/260 |
| 10,694,732 B2 * | 6/2020 | Kalajzich | | A47B 81/005 |
| 2002/0020644 A1 * | 2/2002 | Belanger | A01K 97/06 | 206/315.11 |
| 2006/0070292 A1 * | 4/2006 | Fitzgerald | A01K 97/08 | 43/54.1 |
| 2006/0207161 A1 * | 9/2006 | Lynn | A01K 97/08 | 43/21.2 |
| 2010/0186282 A1 * | 7/2010 | Wada | A01K 97/08 | 43/26 |
| 2015/0313200 A1 * | 11/2015 | Tannahill | A01K 97/06 | 43/26 |
| 2018/0279597 A1 * | 10/2018 | Wilson | | A01K 97/08 |
| 2019/0223424 A1 | 7/2019 | Moses et al. | | |
| 2019/0230911 A1 * | 8/2019 | Smigaj | | A45C 7/0031 |
| 2020/0282917 A1 * | 9/2020 | Sagen | | B60R 9/052 |

\* cited by examiner
† cited by third party

FISHING ROD CARRIER

CROSS-REFERENCE TO RELATED APPLICATIONS

This application is based upon and claims the benefit under 35 U.S.C. § 119(e) of U.S. Provisional Patent Application Ser. No. 62/826,891, filed Mar. 29, 2019, which is incorporated herein by reference in its entirety for all purposes.

FIELD

The present disclosure relates to auto rooftop carriers for sporting equipment. More particularly, the present disclosure relates to auto rooftop carriers for fishing gear.

INTRODUCTION

Fishing enthusiasts are famously willing to invest in high quality and sometimes very expensive equipment in furtherance of their hobby, and therefore have a need to transport their equipment in safety and security. Fishing rods and reels, due to their cumbersome length, can not only be difficult to accommodate within a generic equipment carrier, but can be susceptible to damage while packed.

What is needed is a means for transporting even long fishing rods and their associated reels, including fly rods and reels, in a way that is both safe and secure, and that also offers ease of access.

SUMMARY

The present disclosure is directed to a fishing rod carrier configured to be secured to a rooftop rack of an auto.

In some aspects, the fishing rod carrier can include a stacked plurality of horizontal elongate tubes, each tube having a proximal end, a distal end, and being sized to receive a fishing rode, each of the tubes being capped at the distal end; a reel box attached to each of the proximal ends of the plurality of elongate tubes, the reel box defining an interior space that is continuous with an interior of each of the plurality of elongate tubes, the reel box being configured so that when a fishing rod is disposed inside one of the plurality of horizontal elongate tubes, a fishing reel associated with that fishing rod fits within the defined interior space of the reel box; and a clamping mechanism configured to secure the fishing rod carrier to a rooftop rack of an auto.

In some aspects, the fishing rod carrier can include a plurality of horizontal elongate tubes each sized to receive a fishing rod; an end cap coupled to each of the distal ends of the plurality of elongate tubes; a reel box attached to each of the proximal ends of the plurality of elongate tubes; and a clamping mechanism configured to secure the fishing rod carrier to a rooftop rack of an auto; where the reel box defines an interior space that is continuous with an interior of each of the plurality of elongate tubes, the reel box being configured so that when a fishing rod is disposed inside one of the plurality of horizontal elongate tubes, a fishing reel associated with that fishing rod is oriented nonvertically within the defined interior space of the reel box.

DETAILED DESCRIPTION

Figure 1:
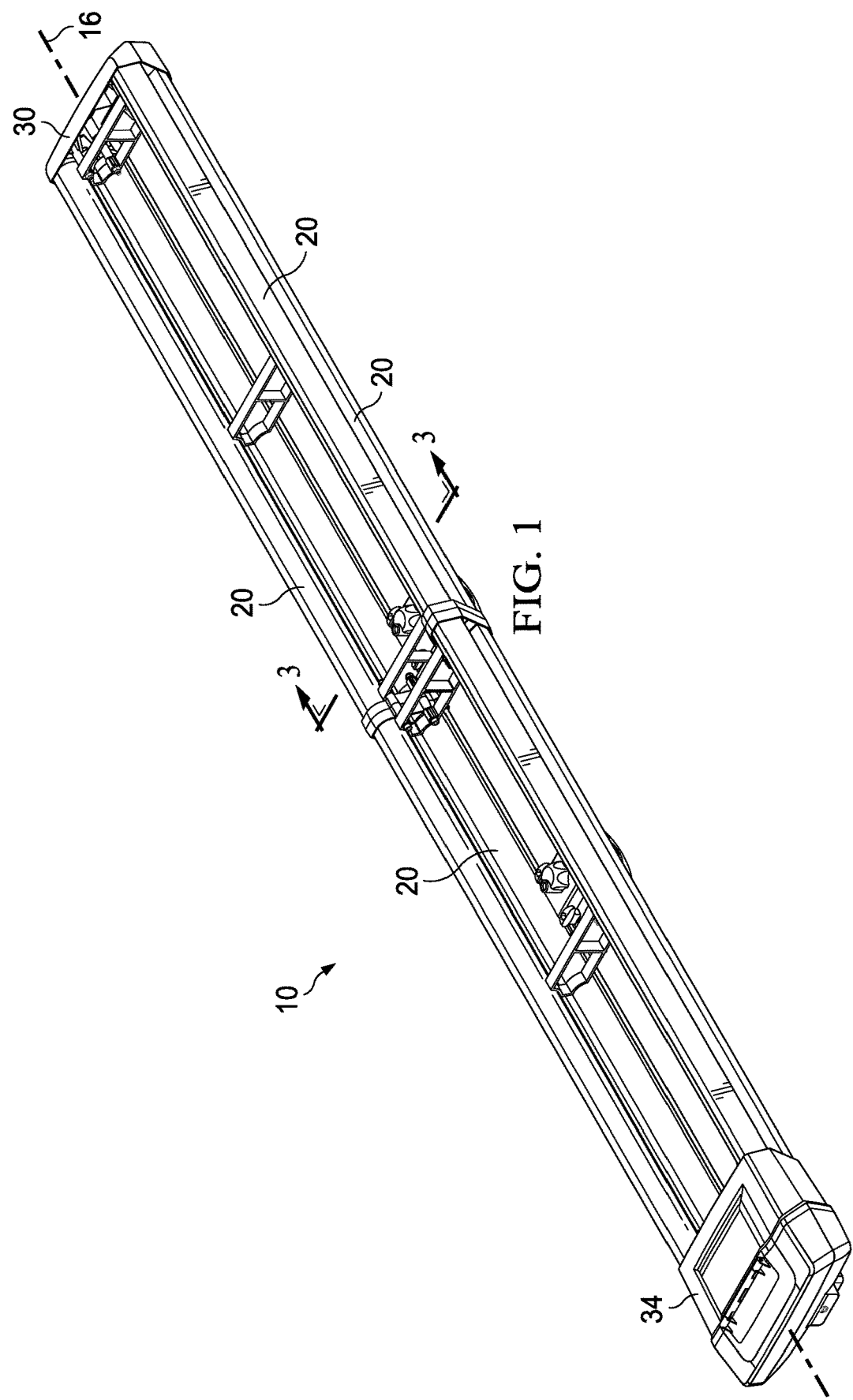
FIG. 1 is an illustrative fishing rod carrier according to the present disclosure.
Figure 2:
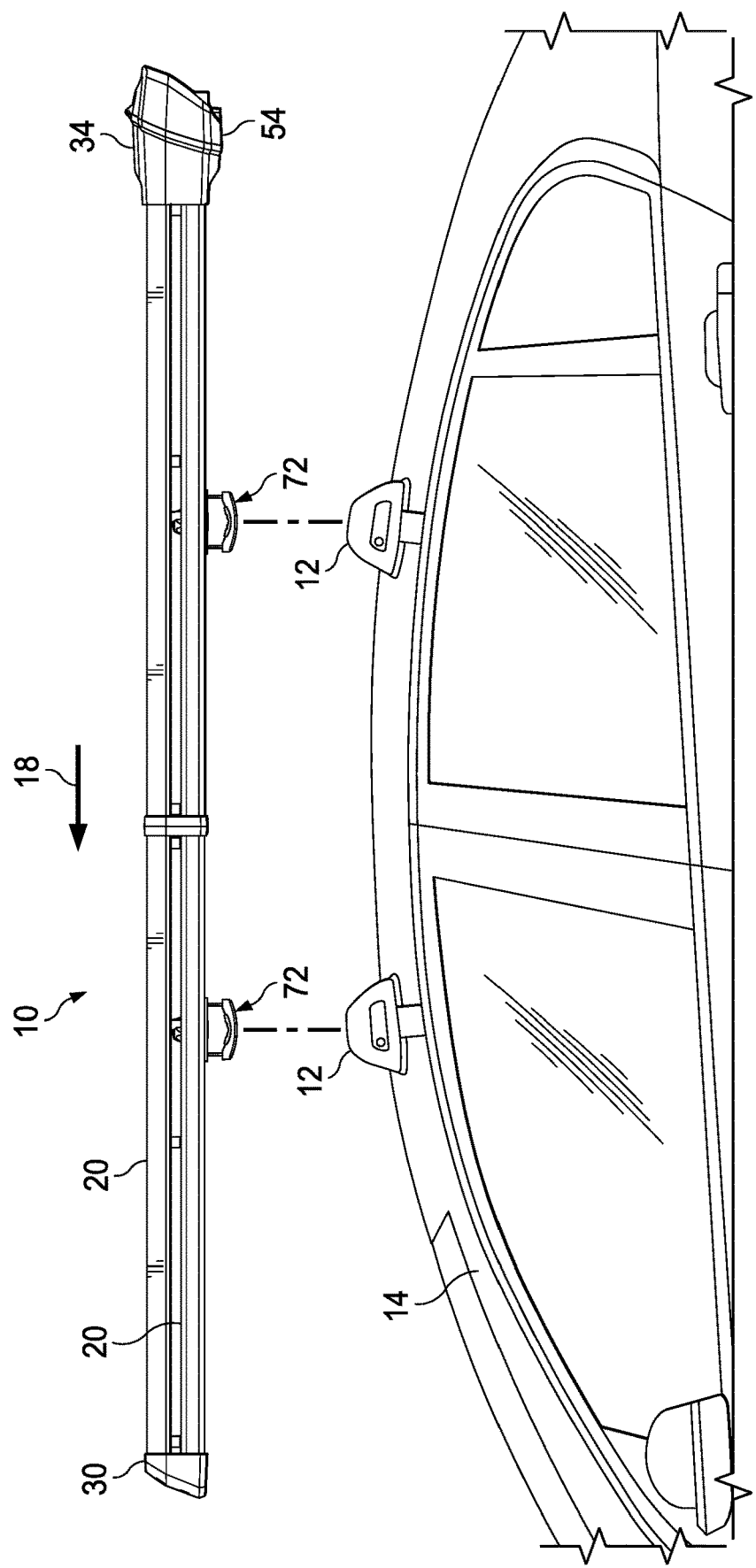
FIG. 2 is a semi-schematic illustration of the fishing rod carrier of FIG. 1 in relation to a rooftop rack of an auto.

A fishing rod carrier 10 according to the present disclosure is shown in FIG. 1. Fishing rod carrier 10 is configured so that it can secure and protect a plurality of fishing rods, and their attached reels, for transport attached to the rooftop rack 12 of an auto 14. Fishing rod carrier 10 is configured to be oriented with a longitudinal axis 16 parallel to the direction of travel 18 of auto 14, as shown in FIG. 2.

Fishing rod carrier 10 includes a plurality of elongate tubes 20, which are sized appropriately to receive a fishing rod. Elongate tubes 20 are arranged so that a longitudinal axis 22 of each elongate tube 20 is at least substantially parallel with the longitudinal axes 22 of each other elongate tube 20, which is parallel with the direction of travel 18 of auto 14.

Each of the plurality of elongate tubes 20 can be fashioned from a materials selected to be rigid and impact-resistant, but also lightweight. Elongate tubes 20 can be metal tubes, and in particular can be made of aluminum. Elongate tubes 20 can exhibit a circular cross-sectional profile, however both the structural strength of fishing rod carrier 10 and the appearance of fishing rod carrier 10 can be enhanced by employing elongate tubes 20 having have an alternative and different cross-sectional profile. In one aspect, elongate tubes 20 exhibit a D-shaped profile, as shown for the fishing rod carrier depicted in FIG. 3.

Fishing rod carrier 10 can include as few as two elongate tubes 20, or as many as eight elongate tubes 20. Typically, fishing rod carrier 10 includes four elongate tubes 20. The width of carrier 10 can be minimized by arranging elongate tubes 20 so that they do not share a common horizontal plane. That is, elongate tubes 20 are not aligned side-by-side in a single row, but can be stacked in the vertical direction. Many avid fishermen, outfitters, and guides can be expected to carry at least two or three fishing rods, and if each rod and reel combination was stored side-by-side in the same horizontal plane, the resulting width of the carrier would dominate the available mounting capacity on most rooftop rack systems.

Figure 3:
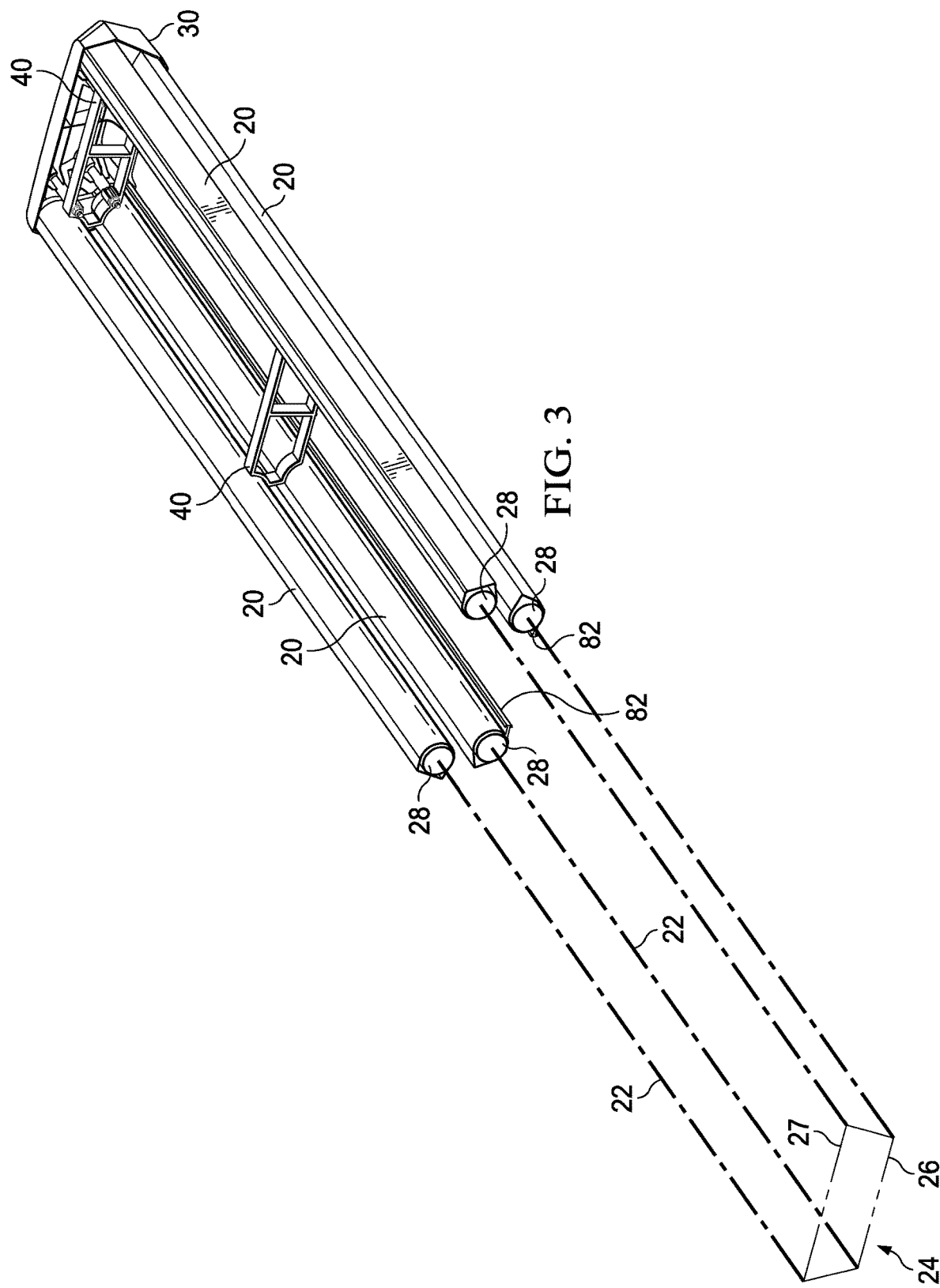
FIG. 3 is a cross-sectional view, as shown in FIG. 1, of the fishing rod carrier of FIG. 1.

In one aspect of the disclosed fishing rod carrier, the fishing rod carrier 10 includes four elongate tubes 20 that are stacked on two levels or tiers. As shown in FIG. 3, the elongate tubes can be stacked on two levels so that the longitudinal axes 22 of the four elongate tubes define a quadrilateral, more particularly, elongate tubes 20 are arranged so that their longitudinal axes define the vertices of a quadrilateral, where two of the elongate tubes 20 define a lower horizontal plane, and two elongate tubes 20 define an upper horizontal plane, where the lower and upper horizontal planes are parallel.

In a particular aspect of the disclosed fishing rod carrier, longitudinal axes 22 of the four elongate tubes 20 define the vertices of an isosceles trapezoid. In particular, the four elongate tubes 20 of fishing rod carrier 10 are disposed so that their longitudinal axes 22 define an isosceles trapezoid 24 having two parallel sides 26 and 27, and the shorter side 26 of the two parallel sides is disposed at the base of the fishing rod carrier 10.

As fishing rods being transported within fishing rod carrier 10 will come into direct contact with the interior of elongate tubes 20, the elongate tubes can include a tube liner 28 that is fashioned of a material selected so that it will be unlikely to scratch or mar a fishing rod contained within elongate tube 20. Typically, tube liner 28 is made from a relatively soft plastic. In one aspect of the fishing rod carrier 10, each elongate tube 20 can include a tube liner 28 that is a cylindrical plastic pipe that is enclosed by the elongate tube 20.

Figure 4:
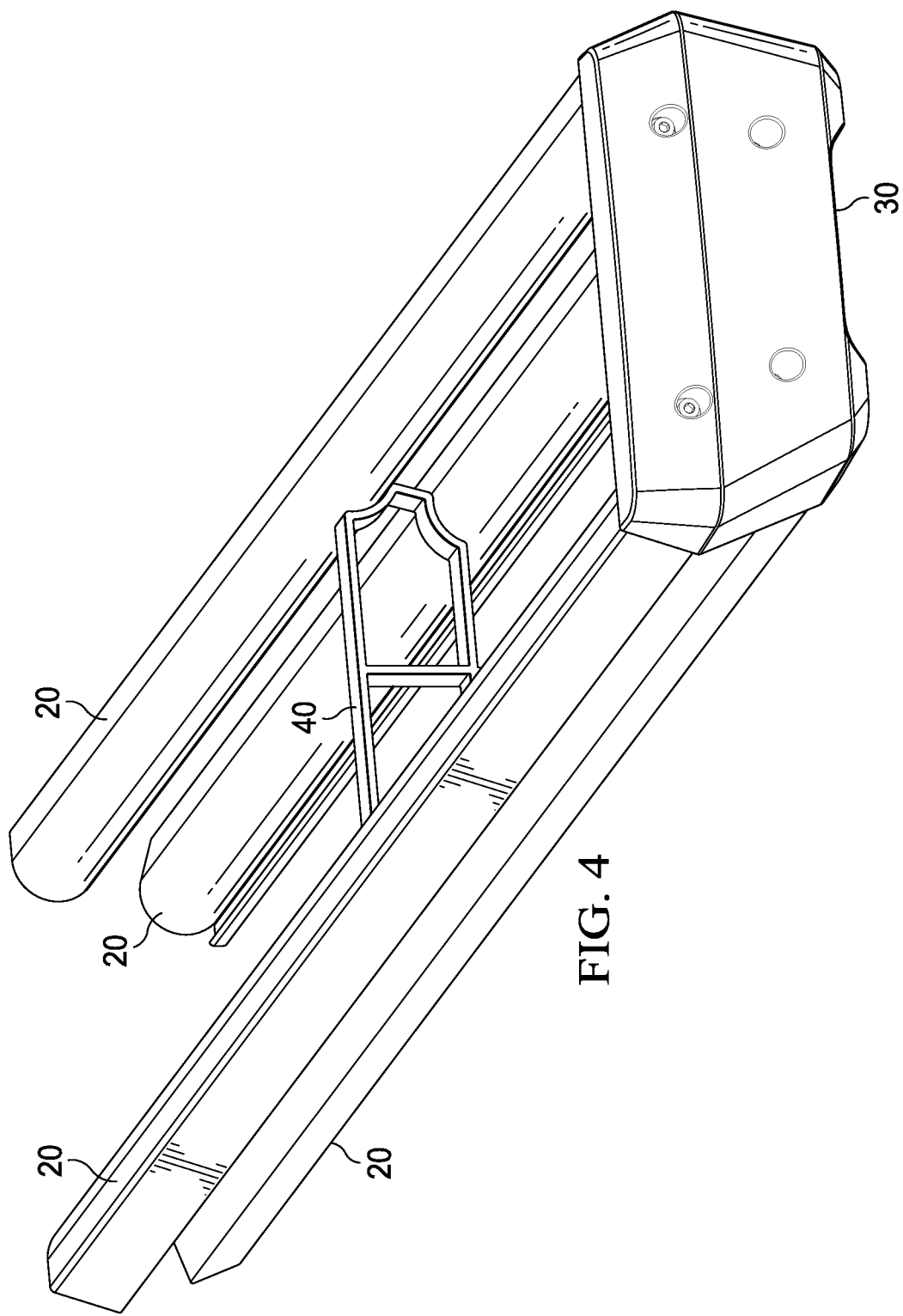
FIG. 4 is an illustration of the distal end of the fishing rod carrier of FIG. 1, including the distal end cap.

The multiple elongate tubes 20 of fishing rod carrier 10 can be capped at their distal ends 32. Each elongate tube 20 can be capped individually. Alternatively, fishing rod carrier 10 can include a single end cap 30 that is coupled to each of the distal ends 32 of the plurality of elongate tubes 20 simultaneously, as shown in FIG. 4. End cap 30 can be configured to be removable, to provide access to the interior of elongate tubes 20. In particular, end cap 30 can be removed to facilitate cleaning of the interior of elongate tubes 20 and/or tube liners 28, for example by flushing each tube with water.

Figure 5:
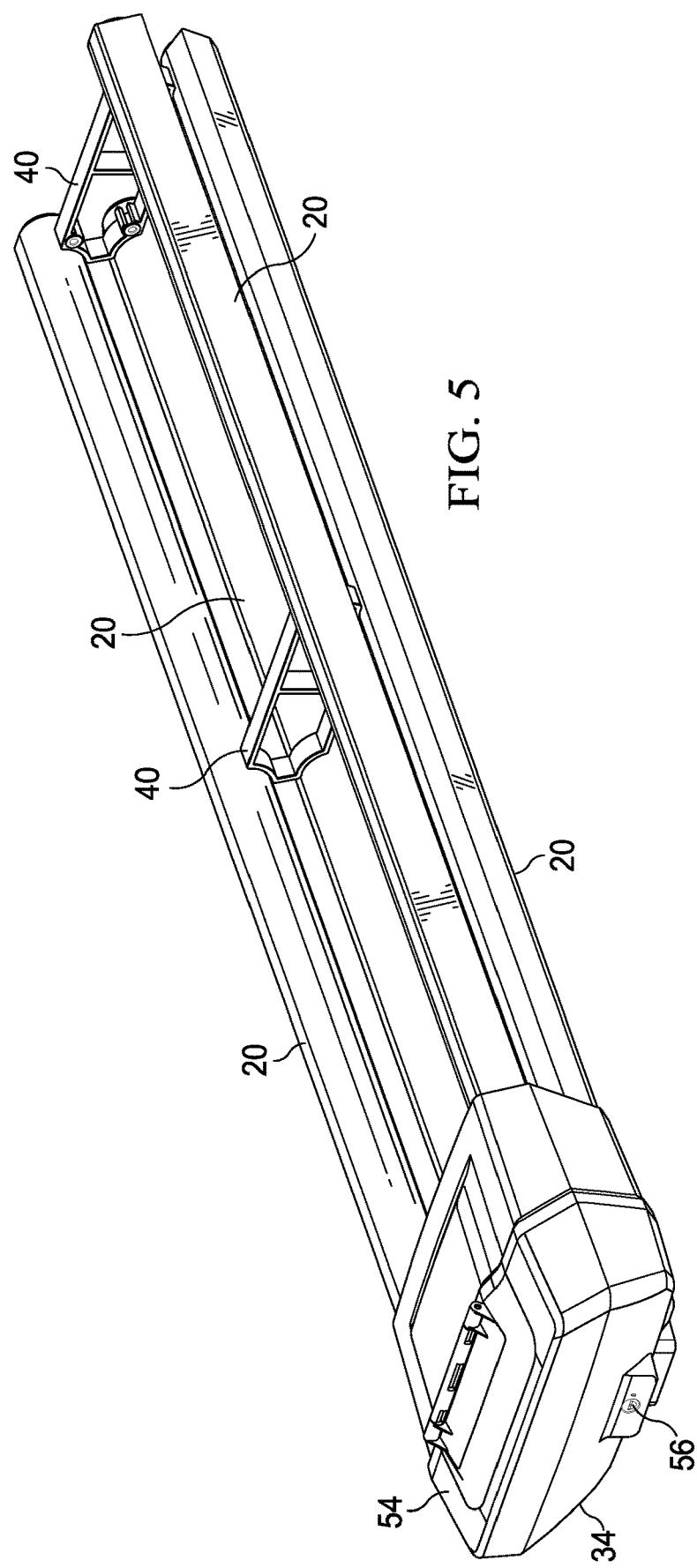
FIG. 5 is an illustration of the proximal end of the fishing rod carrier of FIG. 1, including the reel box.

Fishing rod carrier 10 can also include a reel box 34 that is attached to each of the proximal ends 36 of the plurality of elongate tubes 20, as shown in FIG. 5. Reel box 34 is configured to define an interior space 38 within which a plurality of reels can be enclosed while attached to fishing rods disposed within the plurality of elongate tubes 20.

The plurality of elongate tubes 20 can be coupled together by one or more internal frame structures 40, as shown in FIGS. 3-5. Internal frame structures can span between elongate tubes 20 in a plane substantially orthogonal to the longitudinal axes of elongate tubes 20. Fishing rod carrier 10 can include a number of internal frame structures 40 sufficient to provide structural strength to the assembly of elongate tubes 20. Internal frame structures 40 can be welded to each elongate tube 20 in order to create a rigid frame structure. The resulting elongate structure can be sufficiently rigid, yet lightweight, that the resulting fishing rod carrier 10 can be mounted in such a way that a portion of the carrier is cantilevered from the rooftop rack.

In one aspect of the fishing rod carrier 10, the fishing rod carrier incorporates two or more discrete frame segments. A carrier segment can include a plurality of elongate tubes 20 and can include three frame structures 40 disposed so that one frame structure is adjacent a first end of the frame segment, another frame structure is adjacent a second end of the frame segment, and a third frame structure is disposed intermediate the first and second ends of the frame segment.

Figure 6:
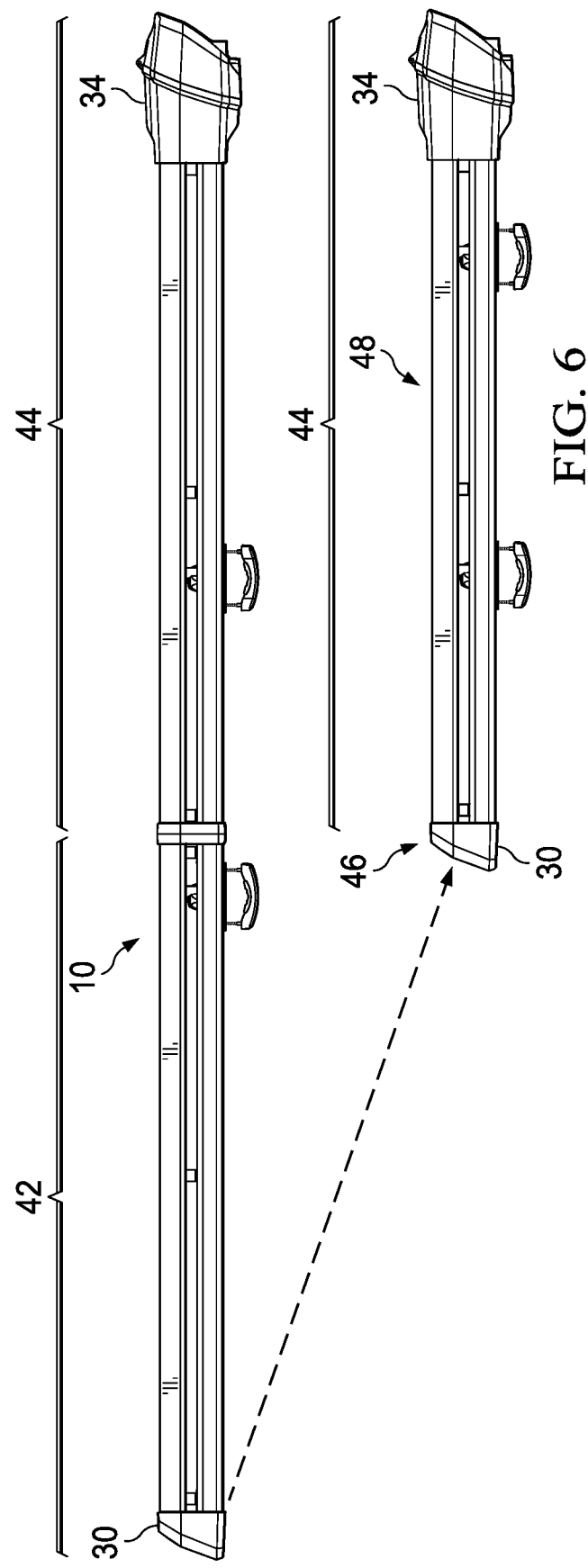
FIG. 6 is a depiction of the fishing rod carrier of FIG. 1 in a long configuration and in a short configuration.

In one aspect, fishing rod carrier 10 can have multiple distinct configurations that include differing numbers of carrier frame segments, as shown in FIG. 6. In particular, a distal carrier segment 42 of the plurality of elongate tubes 20 can be configured to be removed, leaving a proximal carrier segment 44 including a plurality of shortened elongate tubes and reel box 34. End cap 30 can be additionally configured to be removed from distal carrier segment 42, and attached to a distal end 46 of proximal carrier segment 44 to create shortened configuration 48 of fishing rod carrier 10.

Figure 7:
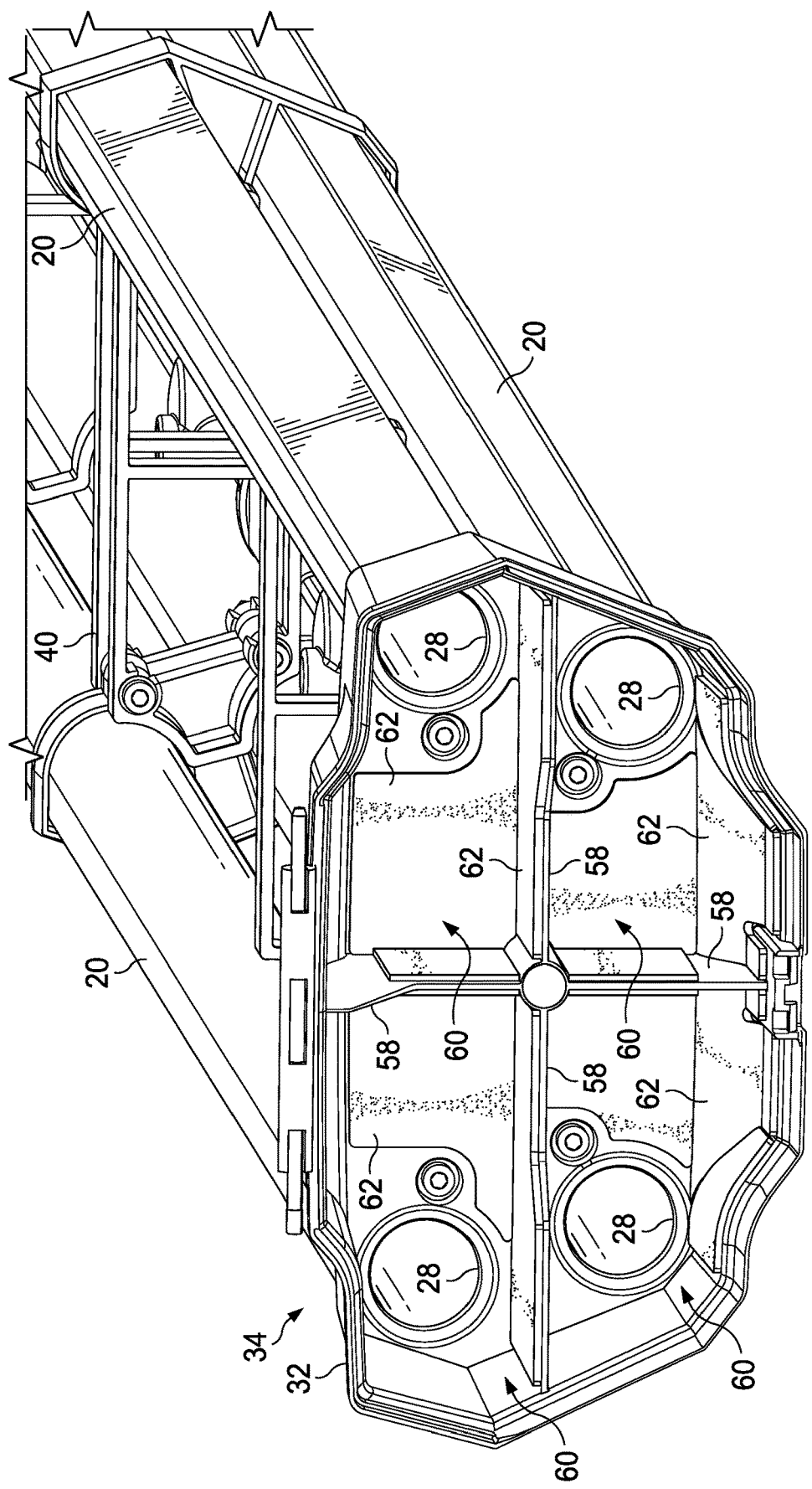
FIG. 7 is an illustration of the reel box of the fishing rod carrier of FIG. 1 with the end portion of the reel box removed revealing the interior of the reel box.
Figure 8:
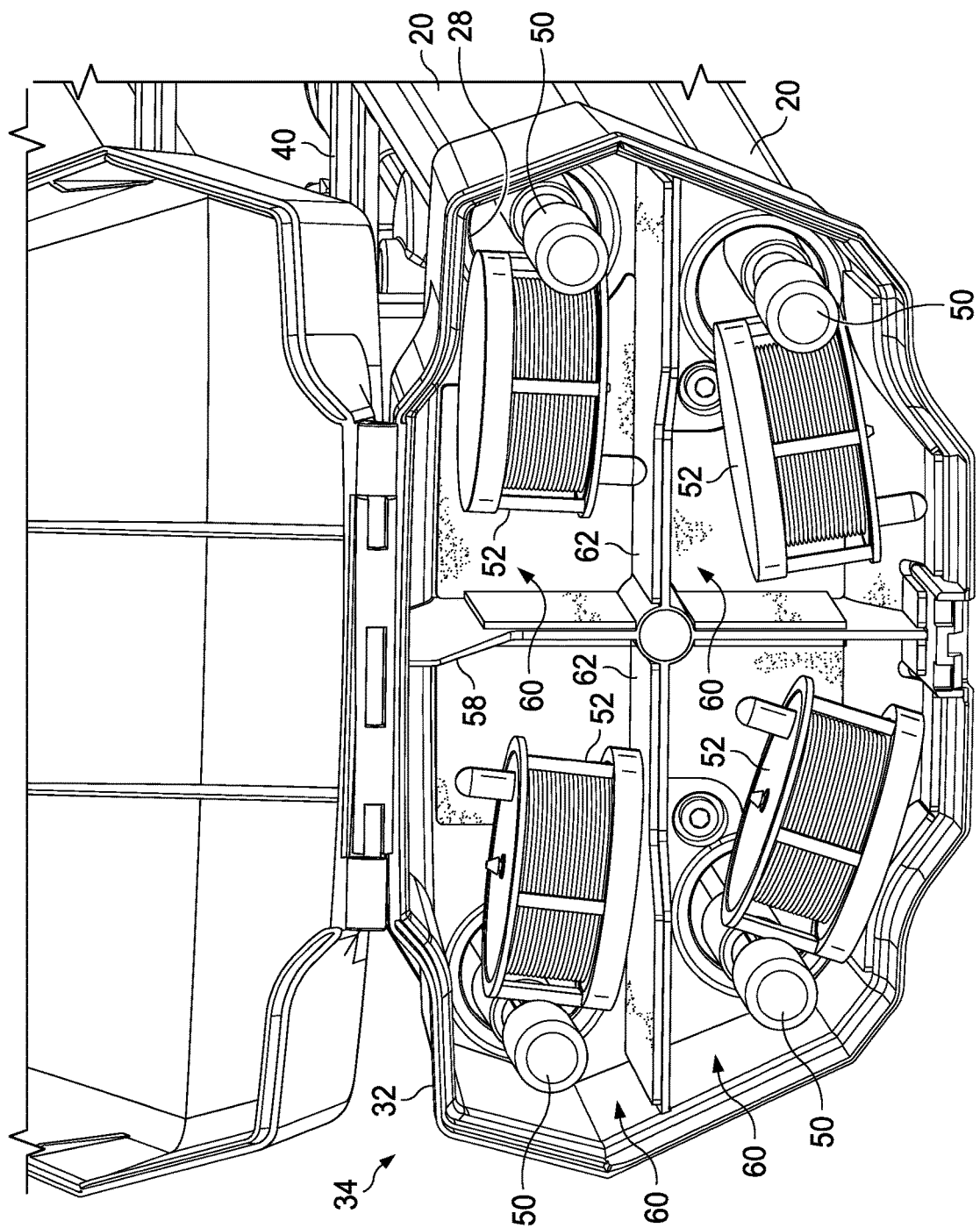
FIG. 8 is an illustration of the reel box interior of FIG. 7 with fishing rods stored therein.
Figure 9:
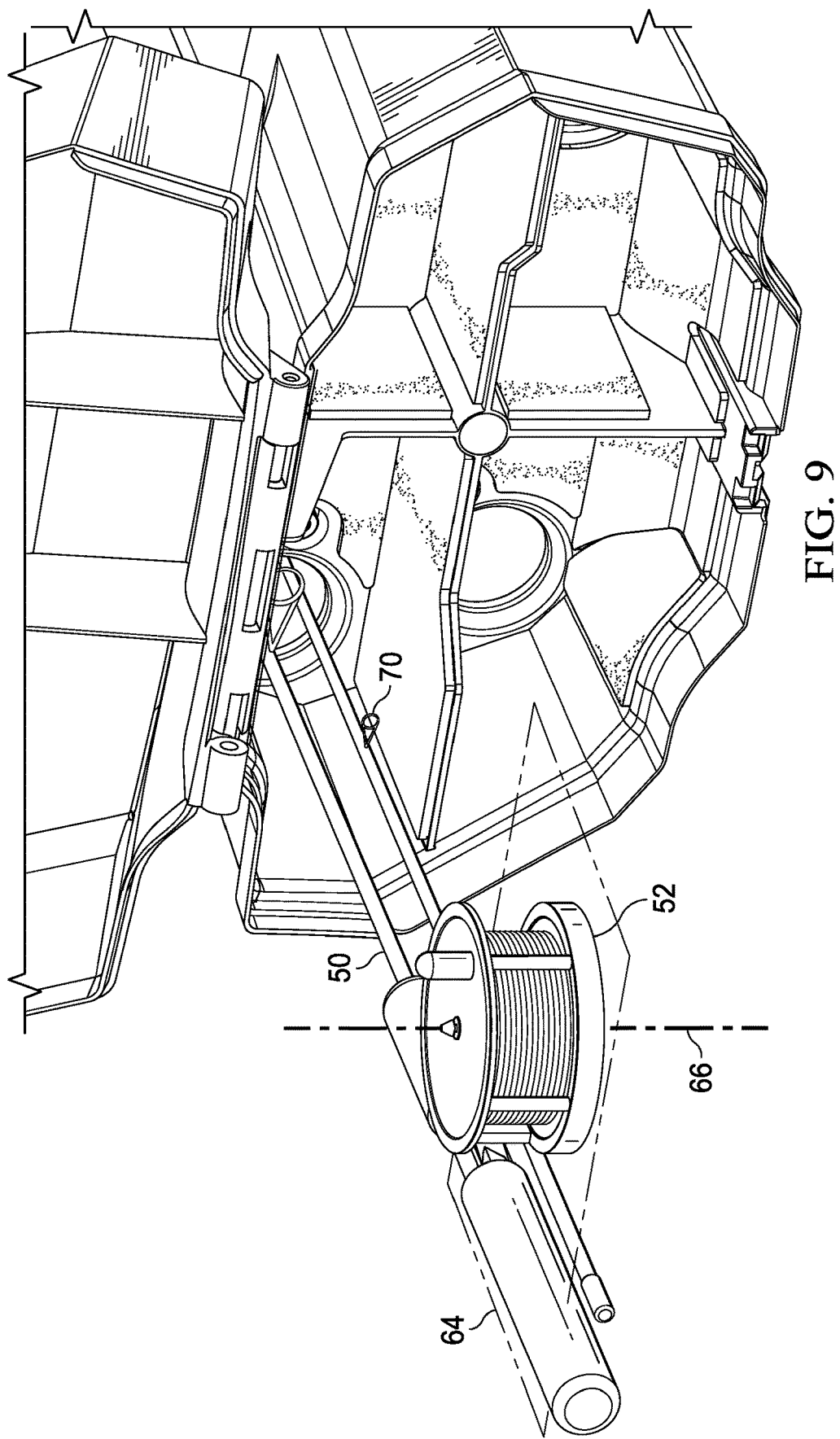
FIG. 9 is an illustration of the orientation of a fishing rod and fishing reel within the reel box of FIG. 7.
Figure 10:
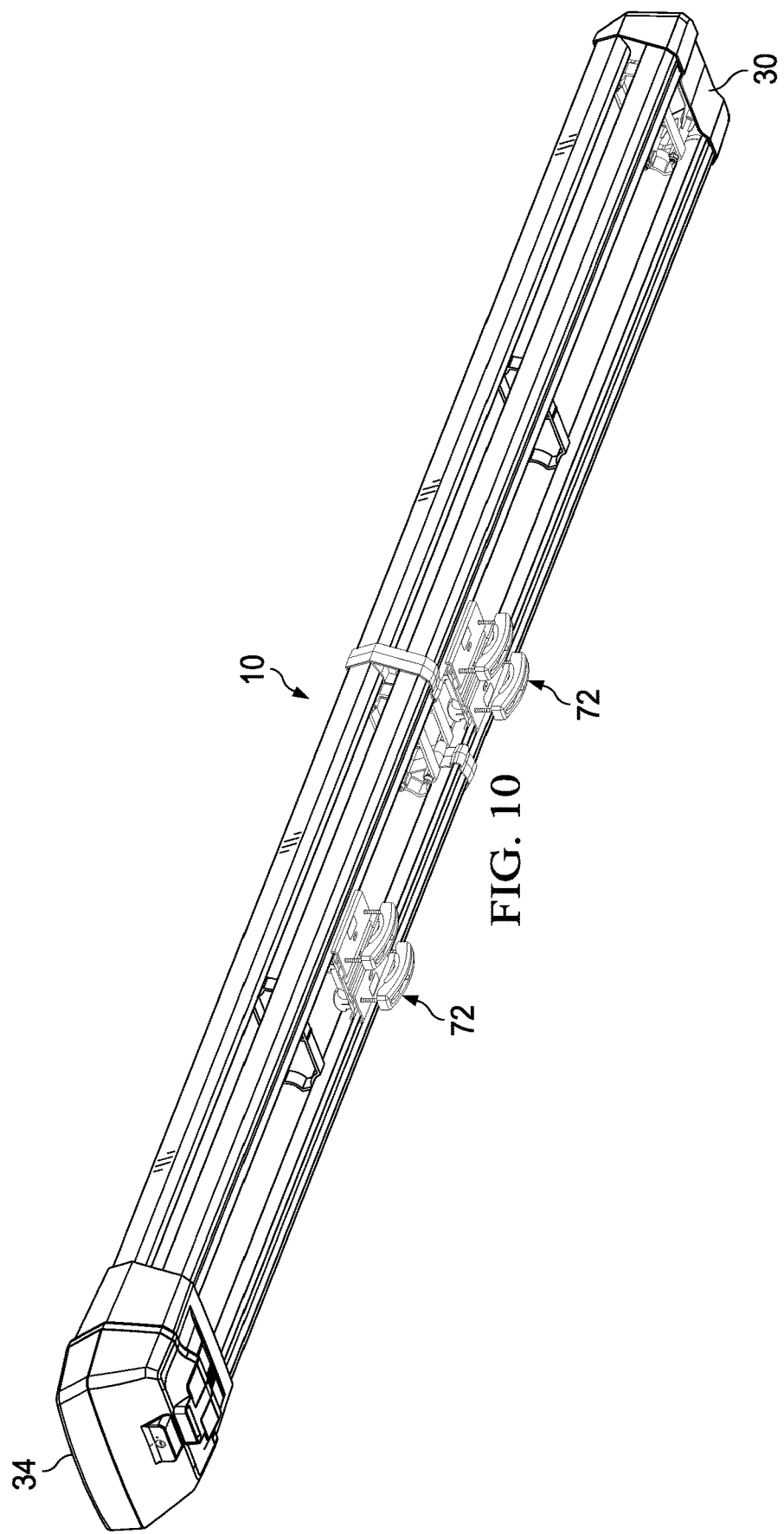
FIG. 10 is an illustration of the underside of the fishing rod carrier of FIG. 1, showing the clamping mechanism of the fishing rod carrier.
Figure 11:
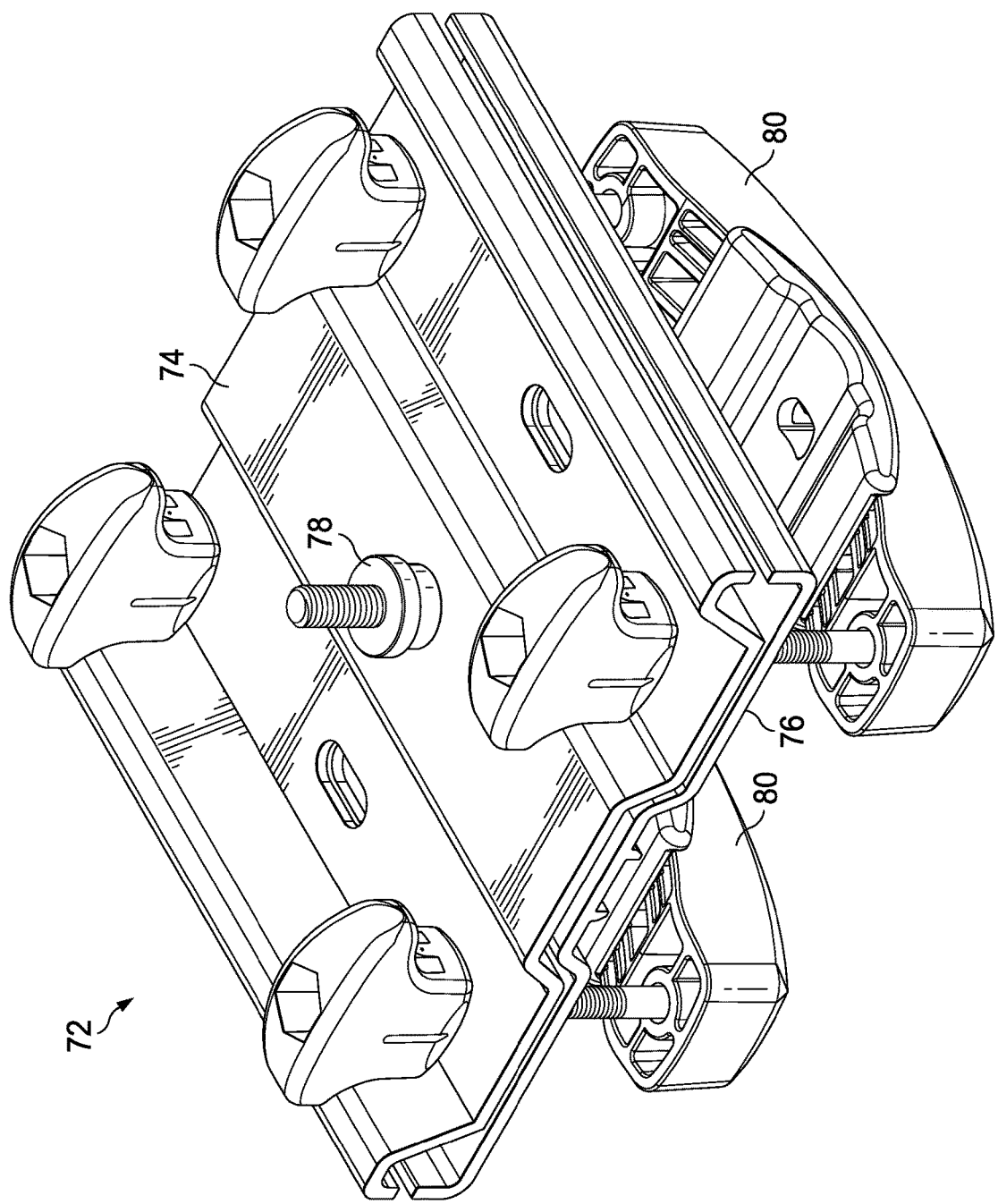
FIG. 11 is an illustration of the clamping mechanism of the fishing rod carrier of FIG. 1 from above.
Figure 12:
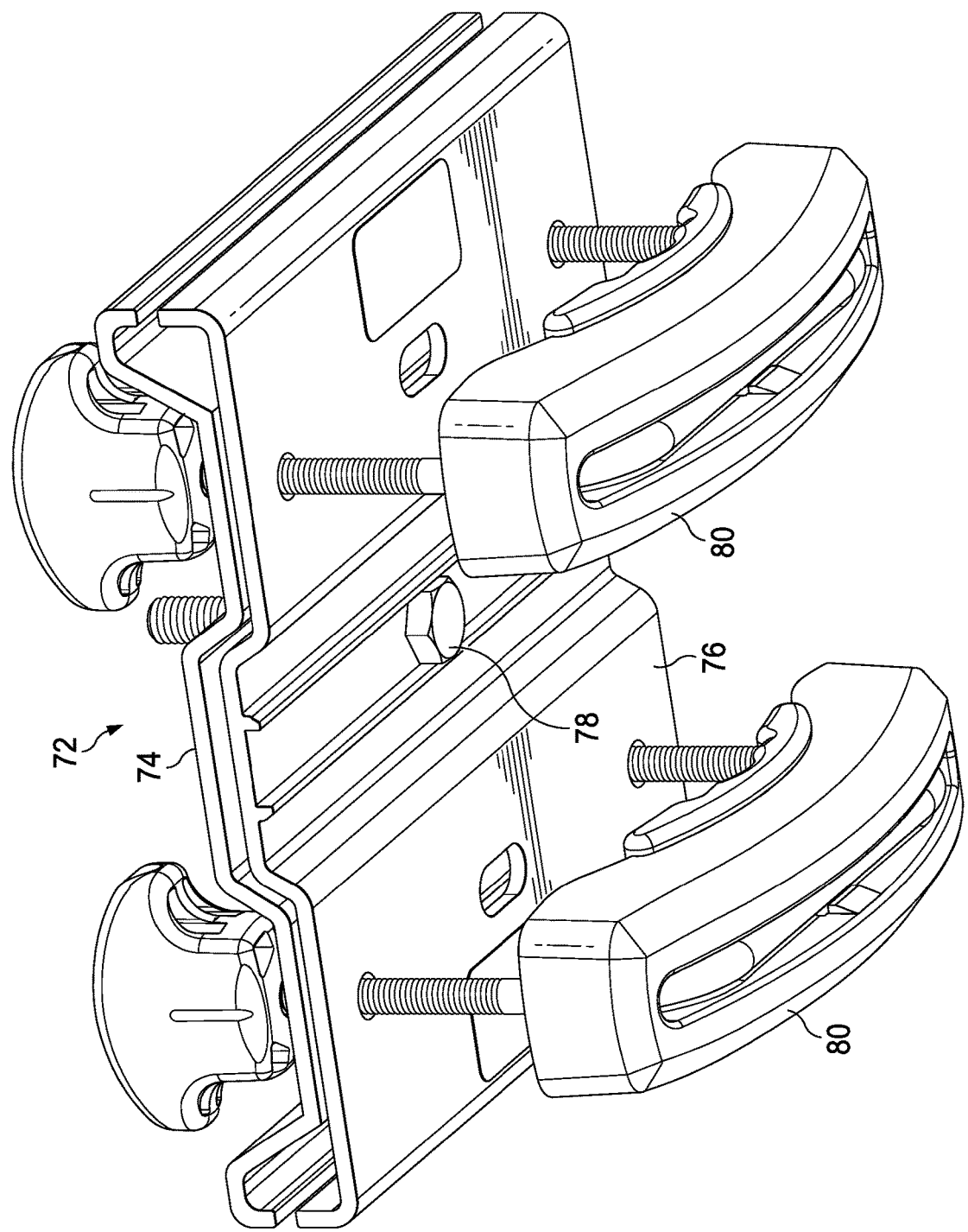
FIG. 12 is an illustration of the clamping mechanism of the fishing rod carrier of FIG. 1 from below.
Figure 13:
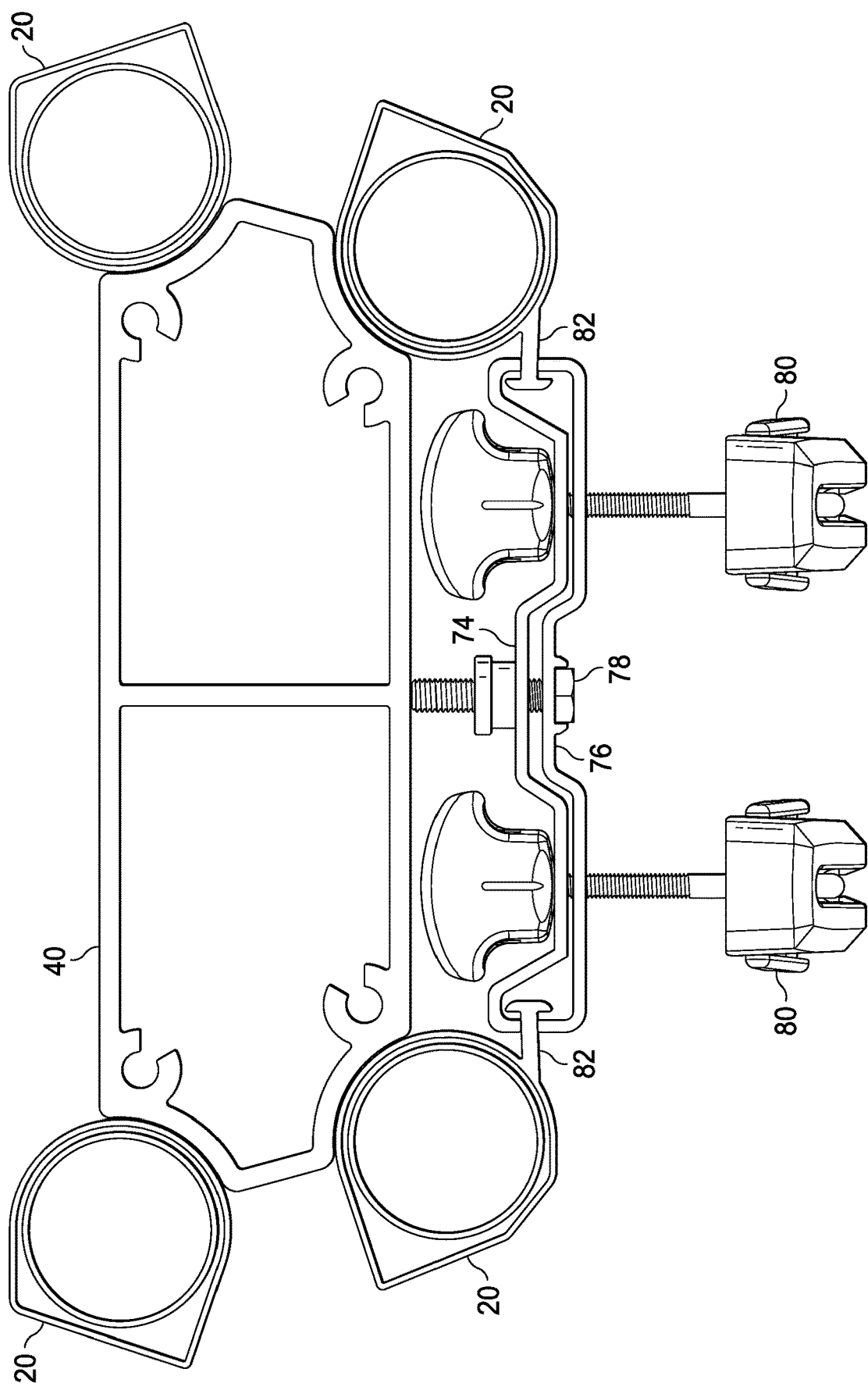
FIG. 13 is a cross-sectional view of the fishing rod carrier of FIG. 1, showing the attachment of the clamping mechanism to the fishing rod carrier.
Figure 14:
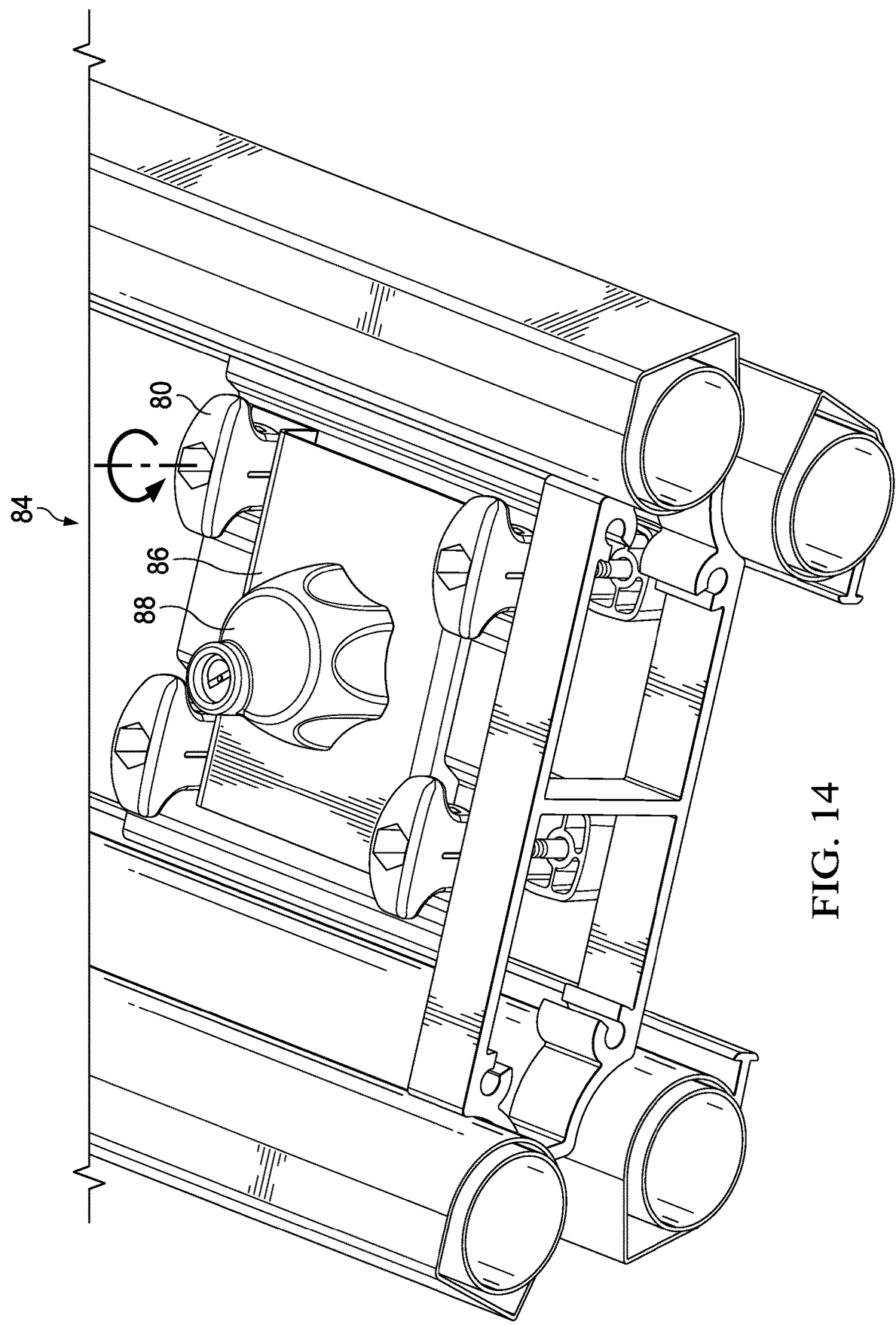
FIG. 14 depicts a locking mechanism for securing the fishing rod carrier of FIG. 1 to a rooftop rack of an auto.

Reel box 34 can be configured to enclose and secure a plurality of fishing rods 50, including a reel 52 coupled to each fishing rod 50 while the rod is stowed within, and enclosed by, elongate tube 20. As shown in FIGS. 7 and 8, reel box 34 can be configured to be opened in order to provide access to interior space 38, and therefore access to the fishing rods 50 enclosed within fishing rod carrier 10. Reel box 34 can include an end portion 54 that is hingedly attached to reel box 34, and so can be pivoted open in order to provide access to interior space 38 and the fishing rods 50 enclosed within fishing rod carrier 10. In order to secure the access provided to interior space 38, reel box 34 can additionally include a lock mechanism 56 that is configured to prevent end portion 54 of reel box 34 from being opened.

In the disclosed embodiment of FIGS. 1-11, four fishing rods 50 can be secured in fishing rod carrier 10 with the reel 52 associated with each fishing rod 50 being protected from damage by internal dividing walls 58 which create multiple separate compartments 60 for each rod/reel combination stored within reel box 34. Compartments 60 can be substantially equivalent in size, but it may be particularly advantageous for the compartments to vary in size in order to house reels of different sizes. Additionally, interior space 38 can be at least partially padded in order to protect the reels disposed within reel box 34. For example, interior space 38 can include felt padding 62 to provide additional protection to fishing reels 52 disposed within reel box 34.

Reel box 34 is configured so that one or more fishing rods 50 can be stored on their sides, as shown in FIG. 7. A fishing rod 50 can be considered to be stored on its side when a reel plane 64 defined by reel 52 is nonvertical, where reel plane 64 is a plane orthogonal to a rotation axis 66 defined by the winding operation of fishing reel 52. Typically the associated fishing reel 52 of reach fishing rod 50 stored in fishing rod carrier 10 is oriented nonvertically. Preferably, the reel plane 64 of each associated fishing reel 52 of each fishing rod 50 stored in fishing rod carrier 10 is at a reel angle 68 that is less than 40° from being horizontally aligned, preferably where reel angle 68 is less than 25° from horizontal, more preferably where reel angle 68 is less than 20° from horizontal.

By storing fishing rods 50 on their sides in this way, the overall size of fishing rod carrier 10 can be reduced. The substantially horizontal orientation of fishing reels 52 also prevents the weight of fishing rods 50 from being supported by line guides 70 of the fishing rod, avoiding wear and tear or potential damage to the line guides, and their connections to fishing rod 50.

Typically fishing rod carrier 10 can include a clamping mechanism 72 configured to secure fishing rod carrier 10 to rooftop rack 12 of auto 14. Any appropriate and/or commercially available clamping mechanism capable of securely attaching fishing rod carrier 10 to rooftop rack 12 can be a suitable clamping mechanism for the purposes of this disclosure. More typically, clamping mechanism 72 can be configured to accommodate a variety of rooftop rack crossbar types with and without t-slot compatibility.

As shown in FIGS. 10-14, an illustrated clamping mechanism 72 suitable for the disclosed fishing rod carrier 10 can include a top clamping plate 74, a bottom clamping plate 76, a clamping plate fastener 78, and two U-shaped clamping bodies 80 for attaching to rooftop rack 12. Clamping plates 74 and 76 can be coupled to the plurality of elongate tubes 20 via extruded longitudinal tracks 82 by placing the track between the two clamping plates and tightening clamping plate fastener 78 to secure the track therein. As clamping plates 74 and 76 can be attached at any point along longitudinal tracks 82, the clamping mechanism 72 provides a wide range of possible rooftop rack crossbar spacings.

U-shaped clamping bodies 80 can be configured to secure clamping plates 74 and 76 to rooftop rack 12 of auto 14. Typically, U-shaped clamping bodies 80 are configured so that they are compatible with a large number of widely available rooftop racks having either round or square crossbar profiles.

Clamping mechanism 72 can also include one or more resilient grip pads attached to the underside of clamping plate 76, to enhance the ability of clamping mechanism 72 to securely attached to a crossbar. Similarly, u-shaped clamping bodies 80 can incorporate features such as plastic covers and/or crossbar grip pads to enhance frictional contact with a crossbar.

Clamping mechanism 72 can additionally include a locking mechanism 84 configured to prevent an unauthorized removal of fishing rod carrier 10 from rooftop rack 12. In one aspect, clamping mechanism 72 can incorporate a locking plate 86, which can be installed with a locking fastener 88, where locking plate 86 is configured to prevent removal of u-shaped clamping bodies 80 when installed with clamping mechanism 72, for example by preventing the rotation of the bolts securing the u-shaped clamping bodies.

The fishing rod carriers 10 of the present disclosure can be configured so that they can accommodate a large variety of fishing rod types, including those used for fly-fishing. In particular, fishing rod carrier 10 can carry up to 12 weight assembled fly rods and reels having a length of up to 10 feet, and can also fit up to 10 foot spey rods that incorporate an extended "fighting butt" handle that projects rearward from the reel mounting location. Spey rods typically require the use of larger stripping guides which cannot fit in currently available fly rod carriers, but can be accommodated by the fly rod carriers of the present disclosure.

EXAMPLES

This section describes additional aspects and features of the disclosed fishing rod carriers, presented without limitation as a series of numbered paragraphs. The subject matter of each of these paragraphs can be combined with the subject matter of one or more other paragraphs, and/or with subject matter presented elsewhere in this disclosure, in any suitable manner. Some of the paragraphs below expressly refer to and further limit other paragraphs, providing without limitation examples of some such suitable combinations.

A1. A fishing rod carrier, comprising: a stacked plurality of horizontal elongate tubes, each tube having a proximal end, a distal end, and being sized to receive a fishing rode, each of the tubes being capped at the distal end; a reel box attached to each of the proximal ends of the plurality of elongate tubes, the reel box defining an interior space that is continuous with an interior of each of the plurality of elongate tubes, the reel box being configured so that when a fishing rod is disposed inside one of the plurality of horizontal elongate tubes, a fishing reel associated with that fishing rod fits within the defined interior space of the reel box; and a clamping mechanism configured to secure the fishing rod carrier to a rooftop rack of an auto.

A2. The fishing rod carrier of paragraph A1, having at least four elongate tubes disposed so that the longitudinal axes of the at least four elongate tubes are parallel to one another and located at multiple elevations.

A3. The fishing rod carrier of paragraph A2, wherein the at least four elongate tubes are arranged on two levels.

A4. The fishing rod carrier of paragraph A2, wherein the longitudinal axes of the four elongate tubes define a quadrilateral.

A5. The fishing rod carrier of paragraph A4, wherein the longitudinal axes of the four elongate tubes define an isosceles trapezoid.

A6. The fishing rod carrier of paragraph A1, wherein the reel box includes a proximal end portion that is hingedly attached to the fishing rod carrier, such that the end portion can be opened to provide access to the reel box interior.

A7. The fishing rod carrier of paragraph A6, further comprising a lock mechanism configured to prevent the end portion of the reel box from being opened.

A8. The fishing rod carrier of paragraph A1, wherein the reel box interior includes multiple reel compartments.

A9. The fishing rod carrier of paragraph A8 wherein the multiple reel compartments vary in size to accommodate reels of different sizes.

A10. The fishing rod carrier of paragraph A8, wherein the multiple reel compartments are separated by internal walls.

A11. The fishing rod carrier of paragraph A8, wherein the multiple reel compartments are accessible through a single opening.

A12. The fishing rod carrier of paragraph A1, wherein the reel box defines an interior space that is continuous with an interior of each of the plurality of elongate tubes, the reel box being configured so that when a fishing rod is disposed inside one of the plurality of horizontal elongate tubes, a fishing reel associated with that fishing rod is oriented nonvertically within the defined interior space of the reel box.

A13. The fishing rod carrier of paragraph 1, wherein a single distal end cap removably caps each of the distal ends of the plurality of elongate tubes.

A14. The fishing rod carrier of paragraph A1, wherein each of the plurality of elongate tubes includes a plastic tube liner.

A15. The fishing rod carrier of paragraph A1, wherein each of the plurality of elongate tubes is an aluminum tube.

A16. The fishing rod carrier of paragraph A1, wherein the plurality of elongate tubes is coupled together by one or more internal frame structures.

A17. The fishing rod carrier of paragraph A1, the clamping mechanism includes one or more clamping plates coupled to the plurality of elongate tubes, and one or more u-shaped clamping bodies to secure the clamping plates to the rooftop rack of the auto.

A18. The fishing rod carrier of paragraph A17, wherein the clamping mechanism includes a locking plate configured to prevent the unauthorized removal of the fishing rod carrier from the rooftop rack of the auto.

A19. The fishing rod carrier of paragraph A1, wherein a distal portion of each of the plurality of elongate tubes can be removed to create a shortened tube, and an end cap can be coupled to each distal end of the shortened tubes to create a short configuration of the fishing rod carrier.

B1. A fishing rod carrier, comprising: a plurality of horizontal elongate tubes each sized to receive a fishing rod; an end cap coupled to each of the distal ends of the plurality of elongate tubes; a reel box attached to each of the proximal ends of the plurality of elongate tubes; and a clamping mechanism configured to secure the fishing rod carrier to a rooftop rack of an auto; wherein the reel box defines an interior space that is continuous with an interior of each of the plurality of elongate tubes, the reel box being configured so that when a fishing rod is disposed inside one of the plurality of horizontal elongate tubes, a fishing reel associated with that fishing rod is oriented nonvertically within the defined interior space of the reel box.

B2. The fishing rod carrier of paragraph B1, wherein the interior space of the reel box is at least partially padded to protect reels disposed within the reel box.

B3. The fishing rod carrier of paragraph B1, wherein the reel box is configured to store a plurality of fishing rods wherein a reel plane defined by each of the reels associated with the plurality of fishing rods has a nonvertical orientation.

B4. The fishing rod carrier of paragraph B1, wherein the reel box is configured to store a plurality of reels while a reel plane defined by each of the reels is substantially horizontal.

B5. The fishing rod carrier of paragraph B1, wherein the reel box is configured to store a plurality of reels while the reel plane defined by each of the reels is disposed at an angle that is less than 40° from horizontal.

B6. The fishing rod carrier of paragraph B1, wherein the reel box is configured to store a plurality of reels while the reel plane defined by each of the reels is disposed at an angle that is less than 25° from horizontal.

B7. The fishing rod carrier of paragraph B1, wherein the reel box is configured to store a plurality of fishing rods without the fishing rods resting on their line guides.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A fishing rod carrier, comprising:
a stacked plurality of horizontal elongate tubes, each tube having a proximal end, a distal end, and being sized to receive a fishing rod, each of the tubes being capped at the distal end;
a reel box attached to the proximal ends of the plurality of elongate tubes, the reel box including a plurality of stacked reel compartments, each reel compartment having a width and a height, the width being greater than the height so that a fly rod reel is required to lay on its side inside the reel compartment, each reel compartment being connected to the proximal end of one of the elongate tubes; and
a clamping mechanism configured to secure the fishing rod carrier to a rooftop rack of an automobile.

2. The fishing rod carrier of claim 1, having at least four elongate tubes disposed so that longitudinal axes of the at least four elongate tubes are parallel to one another and located at multiple elevations.

3. The fishing rod carrier of claim 2, wherein the at least four elongate tubes are arranged on two levels.

4. The fishing rod carrier of claim 2, wherein the longitudinal axes of the four elongate tubes define a quadrilateral.

5. The fishing rod carrier of claim 4, wherein the longitudinal axes of the four elongate tubes define an isosceles trapezoid.

6. The fishing rod carrier of claim 1, wherein the reel box includes a proximal end portion that is hingedly attached to the fishing rod carrier, such that the proximal end portion can be opened to provide access to the reel box interior.

7. The fishing rod carrier of claim 1, wherein the reel compartments are separated by internal walls.

8. The fishing rod carrier of claim 7 wherein the reel compartments vary in size to accommodate reels of different sizes.

9. The fishing rod carrier of claim 1, wherein each of the reel compartments defines an interior space that is continuous with an interior of one of the elongate tubes.

10. The fishing rod carrier of claim 1, wherein a single distal end cap removably caps each of the distal ends of the plurality of elongate tubes.

11. The fishing rod carrier of claim 1, wherein each of the plurality of elongate tubes includes a tube liner comprised of plastic or aluminum.

12. The fishing rod carrier of claim 1, the clamping mechanism includes one or more clamping plates coupled to the plurality of elongate tubes, and one or more u-shaped clamping bodies to secure the clamping plates to the rooftop rack of the automobile.

13. The fishing rod carrier of claim 12, wherein the clamping mechanism includes a locking plate configured to prevent an unauthorized removal of the fishing rod carrier from the rooftop rack of the automobile.

14. The fishing rod carrier of claim 1, wherein a distal portion of each of the plurality of elongate tubes can be removed to create a shortened tube, and an end cap can be coupled to each distal end of the shortened tubes to create a short configuration of the fishing rod carrier.

15. A fishing rod carrier, comprising:
a plurality of horizontal elongate tubes each sized to receive a fishing rod, each elongate tube having a proximal end and a distal end;
an end cap coupled to each of the distal ends of the plurality of elongate tubes;
a reel box attached to the proximal ends of the plurality of elongate tubes; and
a clamping mechanism configured to secure the fishing rod carrier to a rooftop rack of an automobile;
wherein the reel box includes a plurality of stacked reel compartments, each reel compartment having a width and a height, the width being greater than the height, each reel compartment defining an interior space that is continuous with an interior of one of the elongate tubes, the reel box being configured so that when a fishing rod is disposed inside one of the plurality of horizontal elongate tubes, a fishing reel associated with that fishing rod is oriented nonvertically within the defined interior space of the reel compartment.

16. The fishing rod carrier of claim 15, wherein the reel box is configured to store a plurality of fishing rods wherein a reel plane defined by each of the fishing reels associated with the plurality of fishing rods has a nonvertical orientation.

17. The fishing rod carrier of claim 15, wherein the reel box is configured to store a plurality of fishing reels while a reel plane defined by each of the reels is substantially horizontal.

18. The fishing rod carrier of claim 15, wherein the reel box is configured to store a plurality of fishing reels while a reel plane defined by each of the fishing reels is disposed at an angle that is less than 40° from horizontal.

19. The fishing rod carrier of claim 15, wherein the reel box is configured to store a plurality of fishing reels while a reel plane defined by each of the fishing reels is disposed at an angle that is less than 25° from horizontal.

20. The fishing rod carrier of claim 15, wherein the reel box is configured to store a plurality of fishing rods, each having a plurality of line guides, without the fishing rods resting on the line guides.

* * * * *